A. R. LUSCHKA AND J. FOLK.
WORK HOLDER FOR SLICING MACHINES.
APPLICATION FILED SEPT. 8, 1919.
1,356,165.  Patented Oct. 19, 1920.
2 SHEETS—SHEET 2.
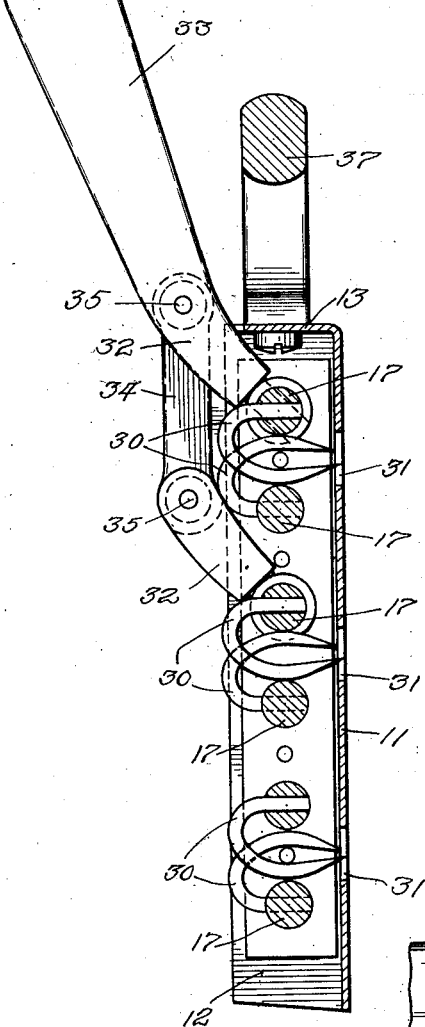
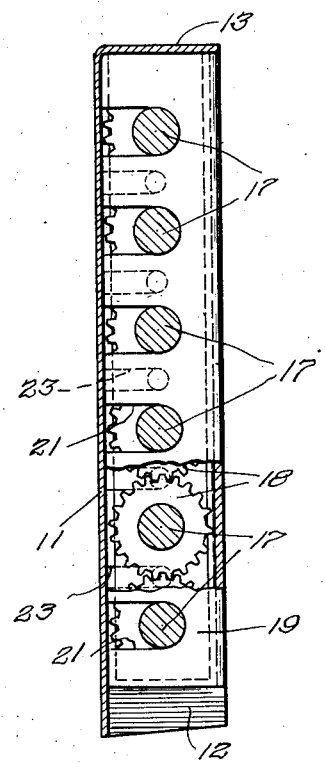
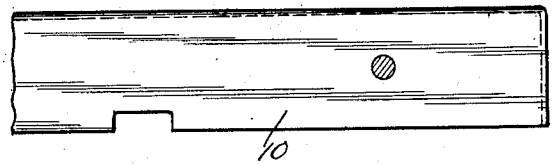

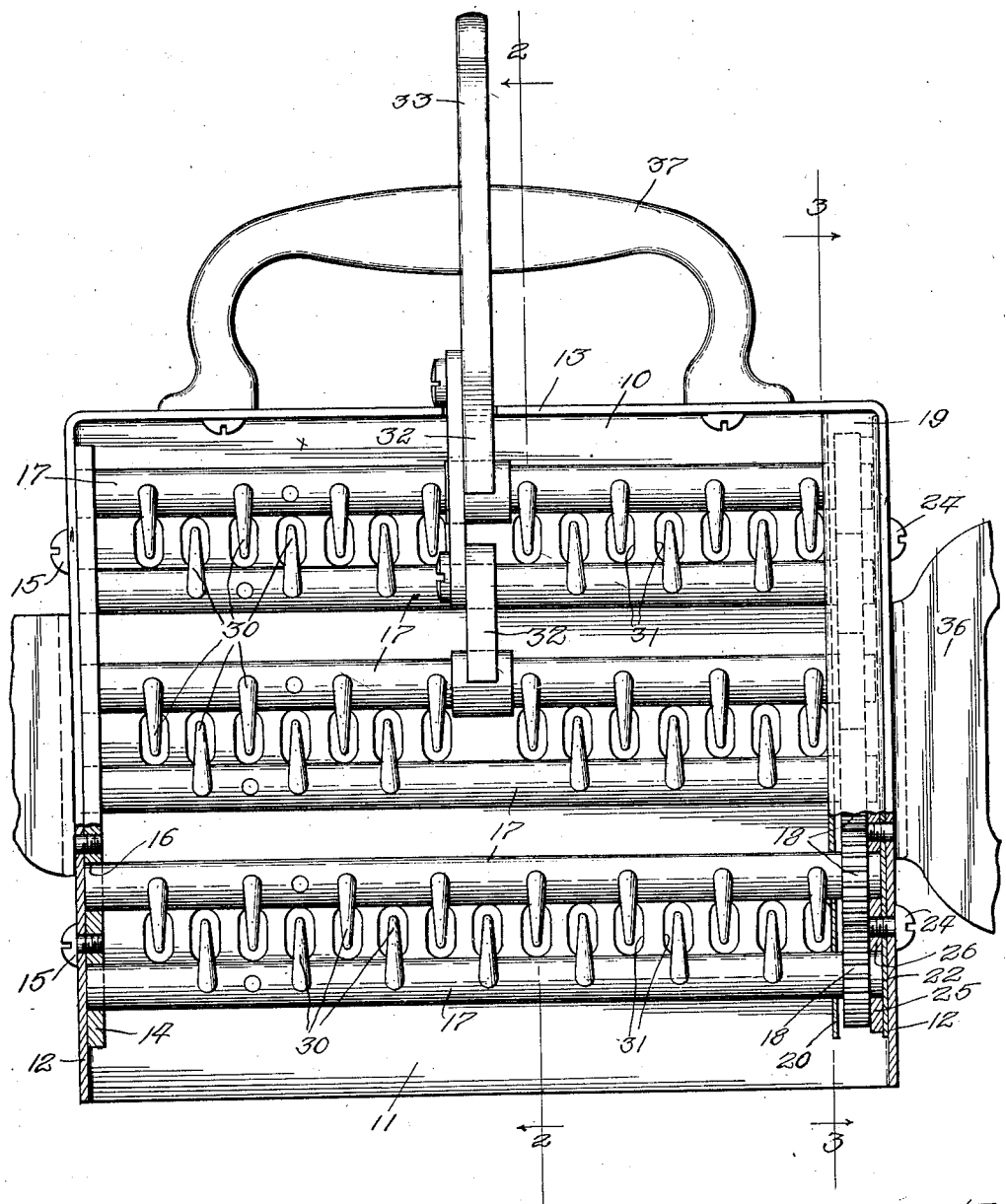

UNITED STATES PATENT OFFICE.

AUGUST R. LUSCHKA AND JOSEPH FOLK, OF LAPORTE, INDIANA, ASSIGNORS TO U. S. SLICING MACHINE COMPANY, OF LAPORTE, INDIANA, A CORPORATION OF INDIANA.

WORK-HOLDER FOR SLICING-MACHINES.

1,356,165.          Specification of Letters Patent.      Patented Oct. 19, 1920.

Application filed September 8, 1919. Serial No. 322,356.

*To all whom it may concern:*

Be it known that we, AUGUST R. LUSCHKA and JOSEPH FOLK, citizens of the United States, residing at Laporte, in the county of Laporte and State of Indiana, have invented certain new and useful Improvements in Work-Holders for Slicing-Machines, of which the following is a specification.

This invention has for its object the provision of a device of the class named which shall be of improved construction and operation. The invention is exemplified in the combination and arrangement of parts shown in the accompanying drawings and described in the following specification and it is more particularly pointed out in the appended claims.

In the drawings—

Figure 1 is a rear elevation of a work-holder showing one embodiment of the present invention.

Fig. 2 is a vertical section on line 2—2 of Fig. 1.

Fig. 3 is a vertical section on line 3—3 of Fig. 1, with parts broken away to better show the construction.

Fig. 4 is a fragmentary top plan view of one end of the frame member of a work-holder.

The work-holder shown in the accompanying drawings is what is known as a "back plate" or "last slice device" somewhat similar to that shown in patent to Henry Thomas No. 1,026,721, and the present invention embodies improvements over the Thomas patent.

In the drawings the numeral 10 designates a main frame or support for the operating mechanism of the work-holder and comprises a plate of sheet metal 11 pressed or stamped into shape so that the latter's edges extend backwardly at right angles to the front plate 11, as shown at 12 in the drawings. The top edge of the plate 11 is similarly bent back at 13 so that the main frame of the holder is formed of an extended plate 11 having three edges pressed backwardly at right angles to the plane of the plate to stiffen the frame and form the sides and top thereof. Against one of the sides 12 of the frame 10 a bar 14 is secured by screws 15 and is provided with a series of circular openings 16 which constitute bearings for one end each of a plurality of shafts 17. At the side of the holder opposite the bar 14 the shafts 17 are each provided with a pinion 18 arranged to intermesh with one another. A thin plate of sheet metal 19 is bent into channel formation and one of the sides 20 of the channel is slotted as shown at 21 so that the channel 19 may fit over the pinions 18 and form a housing for the pinions. The slots 21 provide openings through which the shaft 17 extends into the housing formed by the plate 19. The side 22 of the channel 19 is also slotted as shown at 23 and screws 24 pass through the slots 23 and are threaded into a bar 25 similar to the bar 14. The ends of the shaft 17 adjacent the pinions 18 are journaled in openings 26 in the bar 25. The ends of the shaft 17 are flush with the outer face of the bar 25 and abut against the inner face of the flange 22 of the channel plate 19. When the screws 24 are fastened tightly in place the flange 22 of the channel 19 will be clamped between the bar 25 and the side 12 of the frame of the holder so that the channel casing 19 will be held in place about the pinions 18. If it is desired to remove the channel casing it is only necessary to loosen the screws 24 slightly and draw the channel rearwardly, when it will be completely separated from the frame, the screws 24 sliding in the slots 23 and the shafts 17 sliding in the slots 21.

The shafts 17 are each provided with a plurality of curved hooks or tines 30 which may pass through transverse openings in the shaft 17 and are riveted in place therein, as shown in Fig. 2. It will of course be understood that the tines 30 may be secured to the shafts in any other efficient manner. It will be noted from Fig. 2 that the tines of alternate shafts are turned in opposite directions so that the shafts are arranged in pairs and the tines of the shafts of each pair extend between the shafts to which they are attached. The tines of each pair of shafts are arranged in staggered relation to one another, as shown in Fig. 1, and each tine is provided with an opening 31 in the plate 11 through which the tine may be projected.

One or more of the shafts 17 is provided with a rearwardly extending arm 32 rigidly secured to the shaft and by which the shaft may be partially rotated. One of the arms 32 is extended to form an operating handle 33 and the arms 32 are connected by a link 34 pivoted at 35 to the connected arms. When the handle 33 is in its upper position, as shown in Fig. 2, the tines 30 will be retracted into a position in the rear of the plate 11. When the lever 33 is swung downwardly, however, the tines 30 will be projected through their respective openings 31 and will swing about the axes of the shafts 17 so that the points of the tines will first move forwardly away from the base of the plate 11 to pierce material held against the plate and will then be swung about the axes of the respective shafts so that the points of the tines will be retracted toward the face of the plate and draw the material engaged by the tines firmly against the plate 11. In this way although the tines enter but a short distance into the material to be sliced and lie closely against the plate when the handle 11 is in its lowermost position, the material is firmly clamped to the plate and may practically all be cut into thin slices.

Securing members 36 may be attached to the sides 12 of the frame for holding the device in place on a slicing machine in a manner well known in the art, and a handle 37 may be secured to the upper flange 13 for convenience in handling the device. The arrangement provides an extremely light and strong construction and one which is efficient in operation and inexpensive to manufacture. It will be noted that very little machining is required and that the parts may be largely pressed or stamped from sheet metal, so that the cost of manufacture is reduced to a minimum.

We claim:

1. A work-holder for slicing machines, comprising a plate of thin material having the edges thereof bent at an angle to the plane of said plate to form a casing having one closed side and one open side, rods journaled within said casing, intermeshing gears connected with said rods to cause said rods to rotate in unison with one another, and a housing for said gears comprising a plate of thin material bent into channel formation and arranged with the open side of said channel facing the closed side of said casing and with the closed side of said channel facing the open side of said casing to inclose said gears.

2. A work-holder for slicing machines, comprising a plate of relatively thin material having the edges thereof bent at an angle thereto to form a casing, rods journaled in said casing, intermeshing gears carried by said rods, and a housing for said gears, said housing comprising a channel shaped member having slots in one of the side flanges of said channel to receive said rods and to permit said housing to be moved into and out of position to inclose said gears.

3. A work-holder for slicing machines, comprising a frame, a plurality of rods journaled in said frame, intermeshing gears mounted on said rods, a channel shaped housing for said gears, said housing having slots in one of the side channels thereof for receiving the said rods and having slots in the opposite side flange thereof, and holding members extending through said last mentioned slots to hold said housing in place on said frame.

4. A work-holder for slicing machines, comprising a frame and bearing member secured to said frame by holding devices, rods journaled in said bearing member, intermeshing gears mounted on said rods, and a channel shaped housing for said gears, said housing having slots in one of the side flanges thereof for receiving said rods and also having slots in the opposite side flange thereof for receiving said holding devices, said slots being arranged to permit removal of said housing when said holding devices are loosened.

5. A work-holder for slicing machines, comprising a plate of relatively thin material having the edges thereof bent at an angle thereto to form a casing, bearing members secured to oppositely disposed edges of said plate, rods journaled in said bearing members and extending parallel with said plate within said casing, work engaging tines secured to said rods and arranged to project through openings in said plate to engage material to be held by said work-holder, intermeshing pinions mounted on said rods to cause said rods to rotate in unison with one another, and a channel shaped housing for said pinions arranged with an open face of said channel adjacent the rear face of said frame plate, the side flanges of said channel being provided with slots to permit movement of said housing into and out of position to inclose said pinions.

6. A work-holder for slicing machines, comprising a frame plate having the edges thereof bent at an angle thereto to stiffen said plate and to form an open sided casing, bearing members carried by said angularly disposed edges, rods journaled in said bearing members and provided with curved tines for engaging material to be held by said work-holder, means for rotating said rods to cause said tines to engage material, means for causing said rods to rotate in unison with one another, a housing inclosing said last named means, said housing being movable into and out of position in said casing and fastening members arranged to pass through a wall of said housing into one of said bearing members to hold said housing and bearing member in place in said frame.

7. A work holder for slicing machines comprising a frame plate having the edges thereof bent at an angle thereto to stiffen said plate and to form an open sided casing, bearing members carried by said angularly disposed edges, rods journaled in said bearing members and provided with tines for engaging material to be held by said work holder, intermeshing gears connected with said rods at one end thereof for causing said rods to operate in unison to one another, a housing for said gears comprising a channeled member having the open face thereof arranged against the closed side of said casing and having slots in the lateral faces thereof and screws passing through an angularly disposed edge of said frame plate and through slots in one of the sides of said housing and entering one of said bearing members to clamp the side of said housing between said bearing member and the edge of said casing for retaining said bearing member and housing in place and for permitting ready removal of said housing.

In testimony whereof we have signed our names to this specification on this 29th day of August, A. D. 1919.

AUGUST R. LUSCHKA.
JOSEPH FOLK.